No. 817,698. PATENTED APR. 10, 1906.
E. ELLERMANN.
DRYING APPARATUS FOR MALT.
APPLICATION FILED JUNE 1, 1905.

2 SHEETS—SHEET 1.

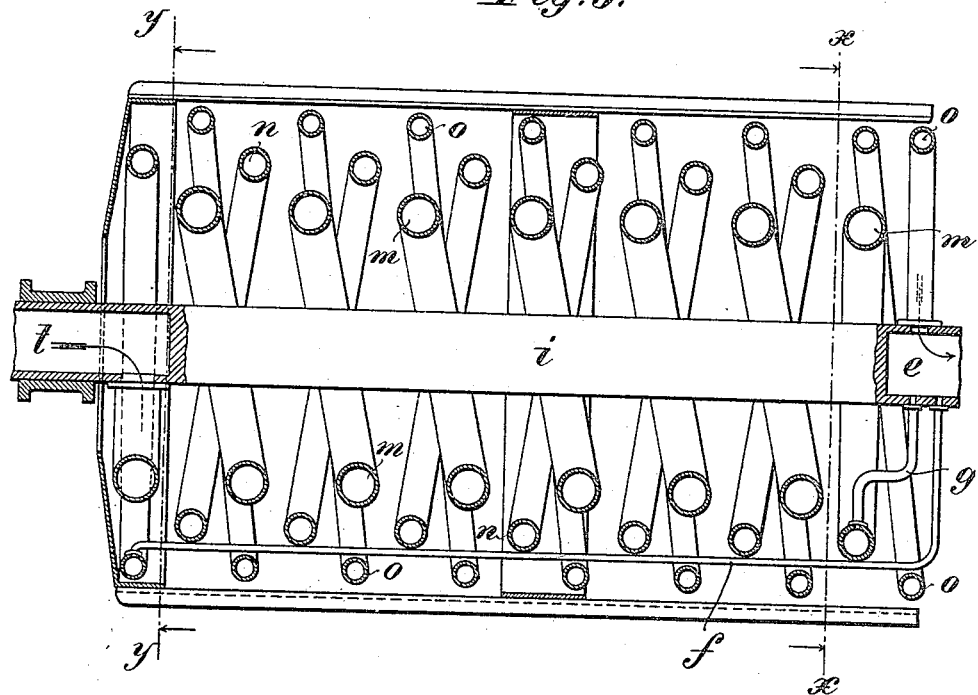
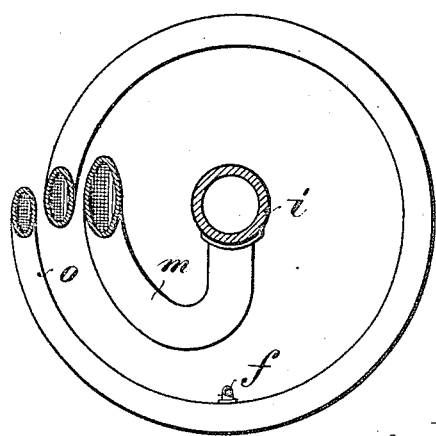
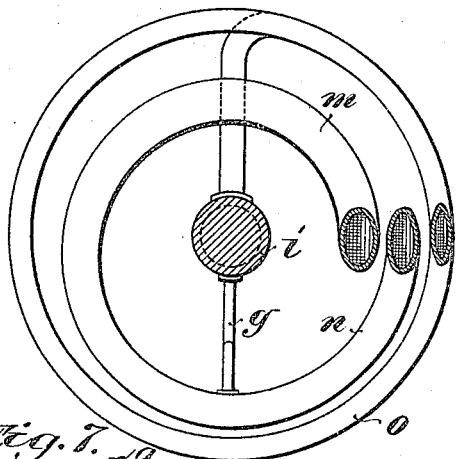
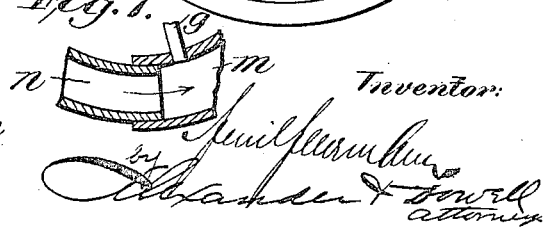

UNITED STATES PATENT OFFICE.

EMIL ELLERMANN, OF BERLIN, GERMANY.

DRYING APPARATUS FOR MALT.

No. 817,698.　　　　Specification of Letters Patent.　　　Patented April 10, 1906.

Application filed June 1, 1905. Serial No. 263,347.

*To all whom it may concern:*

Be it known that I, EMIL ELLERMANN, a subject of the King of Prussia, German Emperor, residing in Berlin, in the Kingdom of Prussia and German Empire, have invented certain new and useful Improvements in and Relating to Drying Apparatus for Malt and the Like; and I hereby declare that the following is a full, clear, and exact description thereof, reference being had to the accompanying drawings, which form part of this specification.

This invention relates to drying apparatus heated with steam or other suitable agent and used for drying malt, cereals, agricultural and industrial refuse, and the like.

The improvement resides mainly in the feature that the steam is led through a system of coil-pipes concentric with the shaft and connected therewith. The internal diameter of the successive coils decreases from the center outward, and said coils are so connected with one another that the steam supplied to and from the hollow shaft flows through the several coils one after another. In order to keep the steam as free as possible from water of condensation, and thereby increase the drying action of the steam and the efficiency of the apparatus, there is connected at the point of junction of one coil with another of different diameter a branch pipe adapted to lead off the water of condensation formed in the different coils, which branch pipes preferably lead to the outlet end of the hollow shaft.

Figure 1:
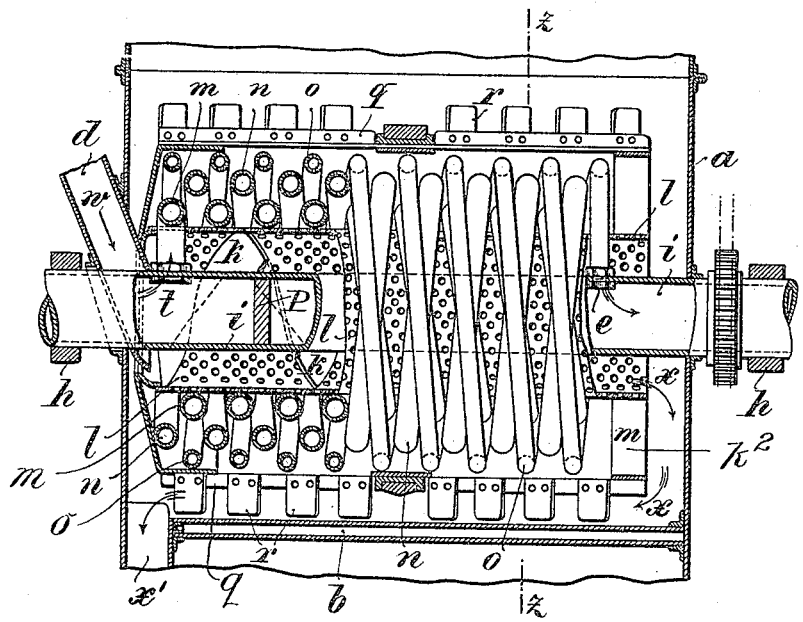
Figure 2:
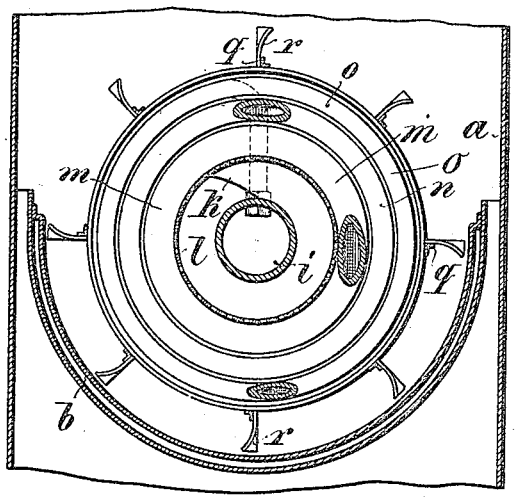

In the accompanying drawings, which illustrate the apparatus embodying the invention, Figure 1 is a vertical longitudinal section of the improved drying apparatus. Fig. 2 is a section on the line 2 2 of Fig. 1. Fig. 3 is an enlarged detail longitudinal section through the system of coiled pipes with the branch pipes at the junction of the coil-pipes. Fig. 4 is a section on the line $x$ $x$ of Fig. 3. Fig. 5 is a section on the line $y$ $y$ of Fig. 3, and Figs. 6 and 7 are detail views illustrating one mode of joining the coils.

The drying apparatus comprises a double-walled casing $b$, in which rotates a hollow shaft $i$, provided with conveyer-helix $k$ and journaled in end bearings $h$ $h$. The conveyer-helix $k$ is surrounded by a wire net or a perforated metal cylinder $l$. When the shaft $i$ is hollow throughout, it is divided by means of a plug P into two end chambers, as in Fig. 1. The said shaft might be hollowed at both ends only, as in Fig. 3.

Concentric with the shaft $i$ and suitably connected therewith is provided a system of concentrically-arranged pipes, in the present case comprising three coils $m$ $n$ $o$. Arranged adjacent the periphery of the outer coil $o$ are angle-irons $q$, supported on arms $k^2$, attached to the cylinder $l$, and to these irons $q$ are secured conveyer-blades $r$, which extend in helical convolutions around the entire system.

The entire apparatus is arranged in a suitable casing.

The coils $m$, $n$, and $o$ are, as shown in Figs. 1 and 3, arranged concentrically around the shaft $i$ and so connected therewith and with each other that the steam admitted at $t$ through the shaft $i$ flows successively through the coils $m$, $n$, and $o$. The steam escapes through the opposite end of the shaft $i$, into which discharges the outer coil $o$ at $e$. At the junctions of the pipes $m$ and $n$ and $n$ and $o$ are connected branches $g$ and $f$, which lead off water of condensation. (See detail Figs. 6 and 7.) The pipes $f$ and $g$ discharge into the hollow space $e$ of the shaft $i$, whence the condensed water led through $f$ and $g$, and the mixture of water and steam coming out of the coil $o$ is led to a condenser. (Not shown.) The number of branch pipes depends on the number of coils, being preferably one less than the number of coils.

By the arrangement described the water of condensation is prevented from entering the steam-passages, and the speed with which the steam passes through the system being increased increased drying power is obtained.

A further advantage is that the heating-coil may be of any desired length and with any desired number of convolutions and loose joints are avoided by welding the joints. The system of coils can be supported by the hollow shaft, and it is easy to make a long hot path for the material to travel. The apparatus is thus specially suitable for treating malt.

The apparatus operates as follows: The material after preliminary drying, if desired, passes through the spout $d$ in the direction of the arrow $w$ into the chamber formed between the shaft $i$, the cylinder $l$, and the conveyer-helix $k$, feeds the material onto the other end of the shaft $i$, where it issues at $x$. Thence the material is fed by means of the conveyer r in the opposite direction and leaves the apparatus at x' and may pass either to a collector or to another drying apparatus. (Not shown.)

Having thus described my invention, what I claim, and desire to secure by Letters Patent of the United States, is—

1. In a drying apparatus, the combination of a casing, a shaft, a system of concentric pipe-coils surrounding the shaft, means for passing material between the shaft and coils, and means for returning the material exterior to the coils, substantially as and for the purpose described.

2. In a drying apparatus, the combination of a casing, a hollow rotatable shaft therein, a system of concentric pipe-coils surrounding the shaft and connected therewith; means for passing material between the shaft and coils, and means for returning the material exterior to the coils, substantially as and for the purpose described.

3. In an apparatus for drying material, the combination of a casing, a shaft, a passage surrounding the shaft, pipe-coils inclosing said passage, means for moving material through said passage, and means for returning the material through the casing exterior to the coils, whereby both the external and internal heat of the coils is utilized, substantially as described.

4. In an apparatus for drying material, the combination of a casing, a hollow shaft, a grain-passage surrounding the shaft, a concentric series of pipe-coils inclosing said grain-passage, a conveyer for moving material along said passage, and means for returning the material through the casing exterior to the coils, substantially as described.

5. In a drying apparatus, the combination of a rotatable shaft provided with steam-passages, a conveyer-helix on said shaft, a cylinder surrounding the helix and pipe-coils surrounding the cylinder, and communicating with the shaft at opposite ends.

6. In a drying apparatus, the combination of a rotatable shaft provided with steam-passages, a conveyer-helix on said shaft, a perforated cylinder surrounding the shaft and helix, and a series of concentric pipe-coils surrounding the cylinder, substantially as described.

7. In a drying apparatus, the combination of a rotatable shaft provided with steam-passages, a conveyer-helix on said shaft, a cylinder surrounding the helix and pipe-coils surrounding the cylinder, and communicating with the shaft at opposite ends; with a casing exterior to the pipe-coils, and a conveyer exterior to the coils and rotating therewith, substantially as and for the purpose described.

8. In a grain-drying apparatus, the combination of a casing, a rotatable shaft therein, a cylinder surrounding said shaft, a connected series of concentric coils surrounding the cylinder, means for feeding material into the cylinder and a conveyer for returning material through the casing exterior to the coils, substantially as described.

9. In a grain-drying apparatus, the combination of a casing, a rotatable shaft therein, a helix on said shaft, a perforated cylinder surrounding said helix, a connected series of concentric coils of successively-different diameters surrounding the cylinder, means for feeding material into the cylinder, and a conveyer rotating with the shaft for returning material through the casing exterior to the coils, substantially as described.

In witness whereof I have hereunto signed my name, this 11th day of May, 1905, in the presence of two subscribing witnesses.

EMIL ELLERMANN

Witnesses:
HENRY HASPER,
WOLDEMAR HAUPT.